(12) United States Patent
Han et al.

(10) Patent No.: US 9,401,530 B2
(45) Date of Patent: Jul. 26, 2016

(54) STORAGE BATTERY RECYCLING APPARATUS

(75) Inventors: Yeon soo Han, Chungbuk Cheongju (KR); Sang Youl Lee, Chungbuk Cheongju (KR); Woo Jong Lim, Daegu (KR)

(73) Assignee: MAROO MCS CO., LTD., Chungbuk (KR)

( * ) Notice: Subject to any disclaimer, the term of this patent is extended or adjusted under 35 U.S.C. 154(b) by 1271 days.

(21) Appl. No.: 13/143,477

(22) PCT Filed: Dec. 21, 2009

(86) PCT No.: PCT/KR2009/007619
§ 371 (c)(1),
(2), (4) Date: Jul. 6, 2011

(87) PCT Pub. No.: WO2010/079904
PCT Pub. Date: Jul. 15, 2010

(65) Prior Publication Data
US 2011/0311844 A1    Dec. 22, 2011

(30) Foreign Application Priority Data

Jan. 12, 2009    (KR) .................. 10-2009-0002334

(51) Int. Cl.
*H02J 7/00*    (2006.01)
*H02J 7/04*    (2006.01)
(Continued)

(52) U.S. Cl.
CPC .......... *H01M 10/54* (2013.01); *H01M 10/4242* (2013.01); *H02J 7/0075* (2013.01); *H01M 2220/20* (2013.01); *H02J 7/0086* (2013.01); *H02J 7/0091* (2013.01); *Y02W 30/84* (2015.05)

(58) Field of Classification Search
CPC ....... H02J 7/0093; H02J 7/0086; H02J 7/008; H02J 7/22; H01M 10/44
USPC .......................................... 320/131, 139, 141
See application file for complete search history.

(56) References Cited

U.S. PATENT DOCUMENTS 3,950,689 A * 4/1976 Jamison .................. H02J 7/022
307/46
4,200,830 A * 4/1980 Oughton ................. H02J 7/022
320/140

(Continued)

FOREIGN PATENT DOCUMENTS

EP    EP09837665    10/2011
JP    09502076 A    2/1997

(Continued)

OTHER PUBLICATIONS

International Search Report, published Application Wo2010/079904 issued on Jul. 5, 2010 by Korean Intellectual Property Office, pp. 1-3.

*Primary Examiner* — Richard Isla Rodas
*Assistant Examiner* — Michael Dibenedetto
(74) *Attorney, Agent, or Firm* — Duane Morris LLP

(57) ABSTRACT

Disclosed herein is a storage battery recycling apparatus in which a pulse current is applied to polar plates or electrodes of a storage battery functioning as a secondary cell through the SCR phase control so as to remove sulfate formed in a film or membrane on the electrodes of the storage battery, thereby recovering the performance of the storage battery in a deteriorated state. The inventive storage battery recycling apparatus includes: a transformer unit 200 for transforming a commercial AC power voltage supplied thereto from an external power source through a power input unit 100; an SCR driving unit 400 for converting the AC power voltage transformed by the transformer unit 200 into a voltage having a pulse waveform through the SCR phase control; an output terminal 500 adapted to be in close contact with the electrodes of the storage battery for supplying the converted pulse voltage outputted from the SCR driving unit 400 to the electrodes of the storage battery so as to charge the storage battery; an SCR controller 300 for controlling the operation of the SCR driving unit 400; a setting unit 600 and a display unit 650 for setting and displaying the operational environment of the storage battery recycling apparatus; a voltage detecting unit 900 and a current detecting unit 950 for detecting the voltage and current of the storage battery; and a microcomputer 700 for controlling the operation of each of the constituent elements.

8 Claims, 9 Drawing Sheets

(51) Int. Cl.
*H01M 10/54* (2006.01)
*H01M 10/42* (2006.01)

(56) References Cited

U.S. PATENT DOCUMENTS

| | | | | |
|---|---|---|---|---|
| 4,358,729 | A | * | 11/1982 | Hart .......................... H05B 6/68 |
| | | | | 323/241 |
| 4,876,468 | A | * | 10/1989 | Libert .................... H03K 17/06 |
| | | | | 327/438 |
| 5,491,399 | A | * | 2/1996 | Gregory et al. ............... 320/102 |
| 5,633,575 | A | * | 5/1997 | Gali ...................... H02J 7/0057 |
| | | | | 320/140 |
| 5,648,714 | A | * | 7/1997 | Eryou et al. .................. 320/139 |
| 5,677,612 | A | * | 10/1997 | Campagnuolo et al. ....... 320/141 |
| 5,891,590 | A | * | 4/1999 | King ................................ 429/49 |
| 6,184,650 | B1 | * | 2/2001 | Gelbman ....................... 320/100 |
| 6,242,886 | B1 | * | 6/2001 | Palanisamy ........... H02J 7/0075 |
| | | | | 320/100 |
| 2008/0180066 | A1 | * | 7/2008 | Makhija .................... H02J 7/04 |
| | | | | 320/163 |
| 2009/0085525 | A1 | * | 4/2009 | Smith ................... H02J 7/0093 |
| | | | | 320/139 |

FOREIGN PATENT DOCUMENTS

| | | |
|---|---|---|
| JP | 2003068371 A | 3/2003 |
| KR | 100275879 B1 | 12/2000 |
| KR | 200236029 Y1 | 10/2001 |

* cited by examiner

STORAGE BATTERY RECYCLING APPARATUS

TECHNICAL FIELD

The present invention relates to an apparatus for recycling a storage battery, and more particularly, to a storage battery recycling apparatus in which a pulse current is applied to polar plates or electrodes of a storage battery functioning as a secondary cell through the SCR phase control so as to remove sulfate formed in a film or membrane on the electrodes of the storage battery, thereby recovering the performance of the storage battery in a deteriorated state.

BACKGROUND ART

Storage batteries (also called 'rechargeable batteries') as secondary cells are widely used in a variety of industrial fields requiring power sources such as batteries for vehicles, batteries for ships, UPS batteries, etc.

The storage batteries repeatedly performs a charge function of converting electric energy into chemical energy and a discharge function of converting chemical energy into electric energy using electrochemical reactions that are electrically reversible. If such rechargeable batteries are used for a long period of time, the performance thereof is deteriorated, thus undergoing a discarding process.

DISCLOSURE OF INVENTION

Technical Problem

The cause, in which the rechargeable batteries are deteriorated in performance so as to be discarded, comes from an increase in internal resistance of the batteries caused by occurrence of sulfation on the polar plates of the batteries. This sulfation is a phenomenon in which sulfate deposited on the electrodes of the batteries during the discharge of the batteries adhere to the battery electrodes without causing the sulfate to fall off the electrodes during the charge of the batteries. Due to this sulfation phenomenon, an electrically nonconducting or insulating film layer is formed on the electrodes of the rechargeable batteries to thus interrupt a passage along which the electrochemical reactions occur. The formation of the insulation film layer on the batteries electrodes reduces the capacity of the batteries and lowers the specific gravity of the electrolyte of the batteries to make the electrolyte inefficient, thereby deteriorating the performance of the storage batteries.

As a solution to the above-mentioned problem to remove sulfate deposited on the electrodes of a storage battery, a device for removing a lead sulfate film formed in a lead-acid battery has been proposed in Korean Patent Laid-Open Publication No. 10-2005-0057544.

The lead sulfate film removing device disclosed in Korean Patent Laid-Open Publication No. 10-2005-0057544 is operated such that in order to remove a lead sulfate film deposited on electrodes of a lead-acid battery, a pulse current having a pulse width of less than 1 μs is outputted from the device to bring about a conduction skin effect, thereby intensively dissolving a surface layer part of the membranous lead sulfate deposit on the electrodes.

However, such a conventional lead sulfate film removing device entails a problem in that since it must includes a separate oscillator, an amplifier, a waveform shaping circuit, a negative pulse generator and the like so as to generate the pulse current having a pulse width of less than 1 μs, the construction and operation of a circuitry becomes complicated and the manufacturing cost increases greatly.

In the meantime, as another solution to the above-mentioned problem to remove sulfate deposited on the electrodes of the storage battery, an apparatus and method for recycling a lead-acid battery has been proposed in Korean Patent Laid-Open Publication No. 10-2006-0090939. The lead-acid battery recycling apparatus and method disclosed in Korean Patent Laid-Open Publication No. 10-2006-0090939 is operated such that a pulse voltage of 1200V to 1400V is applied to a negative electrode and a positive electrode of a waste lead-acid battery for 9 hours so as to remove an oxide film formed on a surface of a lead sulfate ($PbSO_4$) deposited on the electrodes of the storage battery.

However, such a conventional lead-acid battery recycling apparatus and method encounters a problem in that since a high-voltage pulse is applied to the battery electrodes for a predetermined period of time, the lead-acid battery recycling apparatus must include a pulse generator for generating a high-voltage pulse, and an AC pulse voltage generated from the pulse generator must be converted into a DC pulse voltage through a rectifier, so that the construction and operation of a circuitry becomes complicated

Solution to Problem

Therefore, the present invention has been made in view of the above problems occurring in the prior art, and it is an object of the present invention to provide an apparatus for recycling a storage battery, which simplifies the construction and operation of a circuitry and ensures durability of the apparatus while reducing power consumption.

Another object of the present invention is to provide an apparatus for recycling a storage battery, which allows an electric power discharged from the storage battery to return to Electric Power Corporation without consuming the electric power so as to achieve an electricity saving effect in a process of recycling the storage battery.

In order to accomplish the above object, the present invention provides an apparatus for recycling a storage battery, which supplies a power supply voltage to electrodes of the storage battery to remove sulfate formed on the electrodes of the storage battery so as to recover the performance of the storage battery in a deteriorated state, the apparatus including: a transformer unit for transforming a commercial AC power voltage supplied thereto from an external power source through a power input unit; an SCR driving unit for converting the AC power voltage transformed by the transformer unit into a voltage having a pulse waveform through the SCR phase control; an output terminal adapted to be in close contact with the electrodes of the storage battery for supplying the converted pulse voltage outputted from the SCR driving unit to the electrodes of the storage battery so as to charge the storage battery; an SCR controller for controlling the operation of the SCR driving unit; a setting unit and a display unit for setting and displaying the operational environment of the storage battery recycling apparatus; a voltage detecting unit and a current detecting unit for detecting the voltage and current of the storage battery; and a microcomputer for controlling the operation of each of the constituent elements.

The SCR driving unit includes: an SCR element adapted to be driven upon the charging of the storage battery for converting the AC power voltage applied thereto from the transformer unit into a voltage having the pulse waveform under the control of the SCR controller; an SCR element adapted to be driven upon the discharging of the storage battery for converting the power voltage applied thereto according to the discharge of the storage battery into a pulse voltage for application to the transformer unit under the control of the SCR controller; a main switch for electrically connecting an SCR element for charging the storage battery and an SCR element for discharging the storage battery to the transformer unit, and interrupting the electrical connection therebetween under the control of the microcomputer; and a reactor for absorbing an electrical shock due to a surge voltage generated from the storage battery and supplied to the SCR element through the output terminal and protecting the SCR driving unit.

In addition, the SCR controller includes: a pulse signal generator for generating a pulse signal for timing; a counter for the pulse signal generated from the pulse signal generator; a selector for generating a plurality of code signals by combing a code signal applied thereto from the microcomputer and a counter signal applied thereto from the counter and sequentially outputting the generated plurality of signals; a programmable logic device (PLD) determining unit for checking the phases of the signals according to the order of the code signals outputted from the selector, and selecting an output signal in response to a pulse selecting signal applied thereto from the microcomputer; and an SCR driver for controlling the operation of each of the two SCR elements included in the SCR driving unit in response to the output signal from the PLD determining unit.

The microcomputer includes: a relay control unit for transmitting a contact point signal to the main switch included in the SCR driving unit; an SCR control driving unit for transmitting a code output and control signal to the SCR controller; a detected voltage input unit for receiving a voltage signal from the voltage detecting unit; a detected current input unit for receiving a current signal from the current detecting unit; a measured temperature input unit for receiving a temperature signal from the temperature measuring unit; and a central control unit for controlling the operation of each of the constituent elements of the microcomputer.

Advantageous Effects of Invention

As described above, the storage battery recycling apparatus according to the present invention has the advantageous effects in that a commercial AC power voltage is converted into a pulse voltage, and then the pulse voltage is applied to the electrodes of the storage battery through the SCR phase control so as to remove sulfate formed on the electrodes of the storage battery, so that the construction of the apparatus is simplified to reduce the manufacturing cost and the storage battery can be recycled efficiently while reducing the power consumption.

In addition, the storage battery recycling apparatus according to the present invention has another effect in that the electric power discharged from the storage battery returns to Electric Power Corporation so as to achieve an electricity saving effect in a process of recycling the storage battery.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

BEST MODE FOR CARRYING OUT THE INVENTION

The preferred embodiments of the invention will be hereinafter described in more detail with reference to the accompanying drawings.

Figure 1:
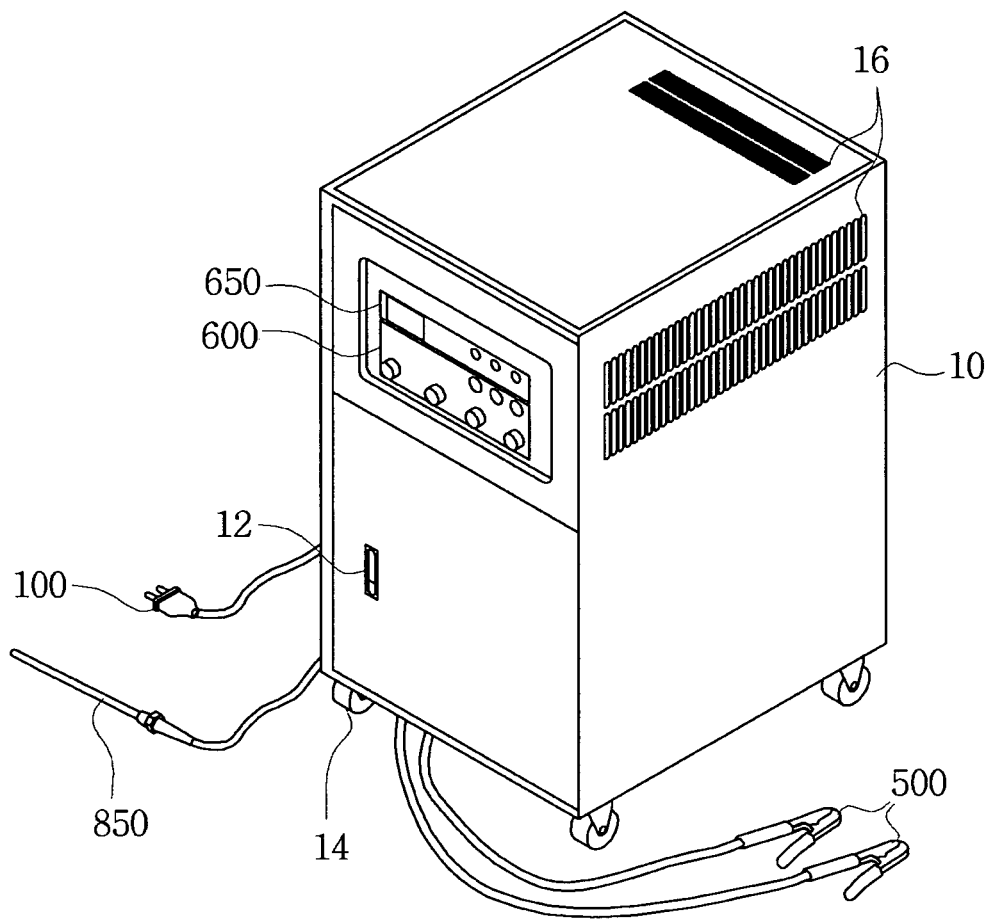
FIG. 1 is a perspective view illustrating a storage battery recycling apparatus according to a preferred embodiment of the present invention.

FIG. 1 is a perspective view illustrating a storage battery recycling apparatus according to a preferred embodiment of the present invention.

As shown in FIG. 1, the storage battery recycling apparatus according to the present invention includes a main body 10 having four wheels 14 mounted at a bottom surface thereof for the movement of the apparatus and radiators 16 formed at a top surface thereof, at both sides thereof and at a rear surface thereof, respectively, so as to release heat generated from the inside of the apparatus. Also, the main body 10 includes a setting unit 600 and a display unit 650 mounted at a front surface thereof so as to set and display the operational environment of the storage battery recycling apparatus, and a case door 12 mounted at a lower portion of the front surface thereof so as to open the inside thereof.

In the meantime, mounted at the outside of the main body 10 are a power input unit 100 such as a power supply cord for receiving a commercial AC voltage from an external power source, clamp-type output terminals 500 detachably coupled to electrodes of a storage battery for supplying a charging voltage to the storage battery, and a temperature detecting unit 850 for measuring the temperature of the storage battery.

Mounted at the inside of the main body 10 is a storage battery recycling circuit for performing the recycling operation of the storage battery in such a fashion as to convert the AC power voltage supplied to the storage battery recycling circuit through the power input unit 100 into a pulse voltage through the SCR (Silicon Controlled Rectifier) control and supply the converted pulse voltage to the storage battery through the output terminals 500.

Figure 2:
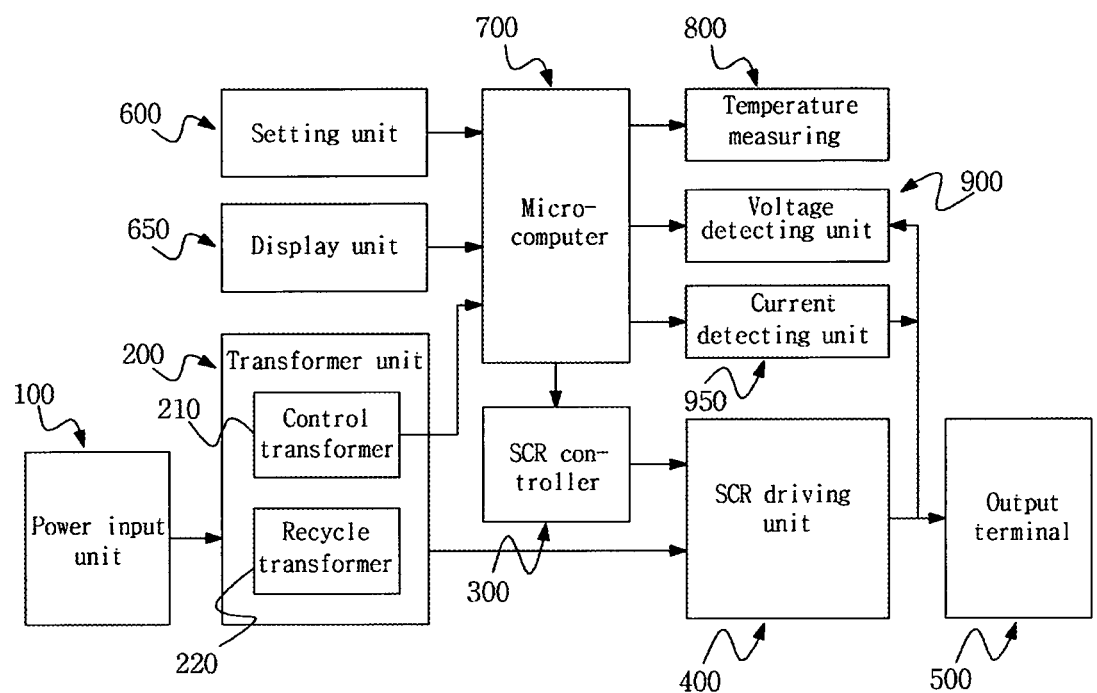
FIG. 2 is a block diagram illustrating the entire construction of a storage battery recycling apparatus according to a preferred embodiment of the present invention.
Figure 3:
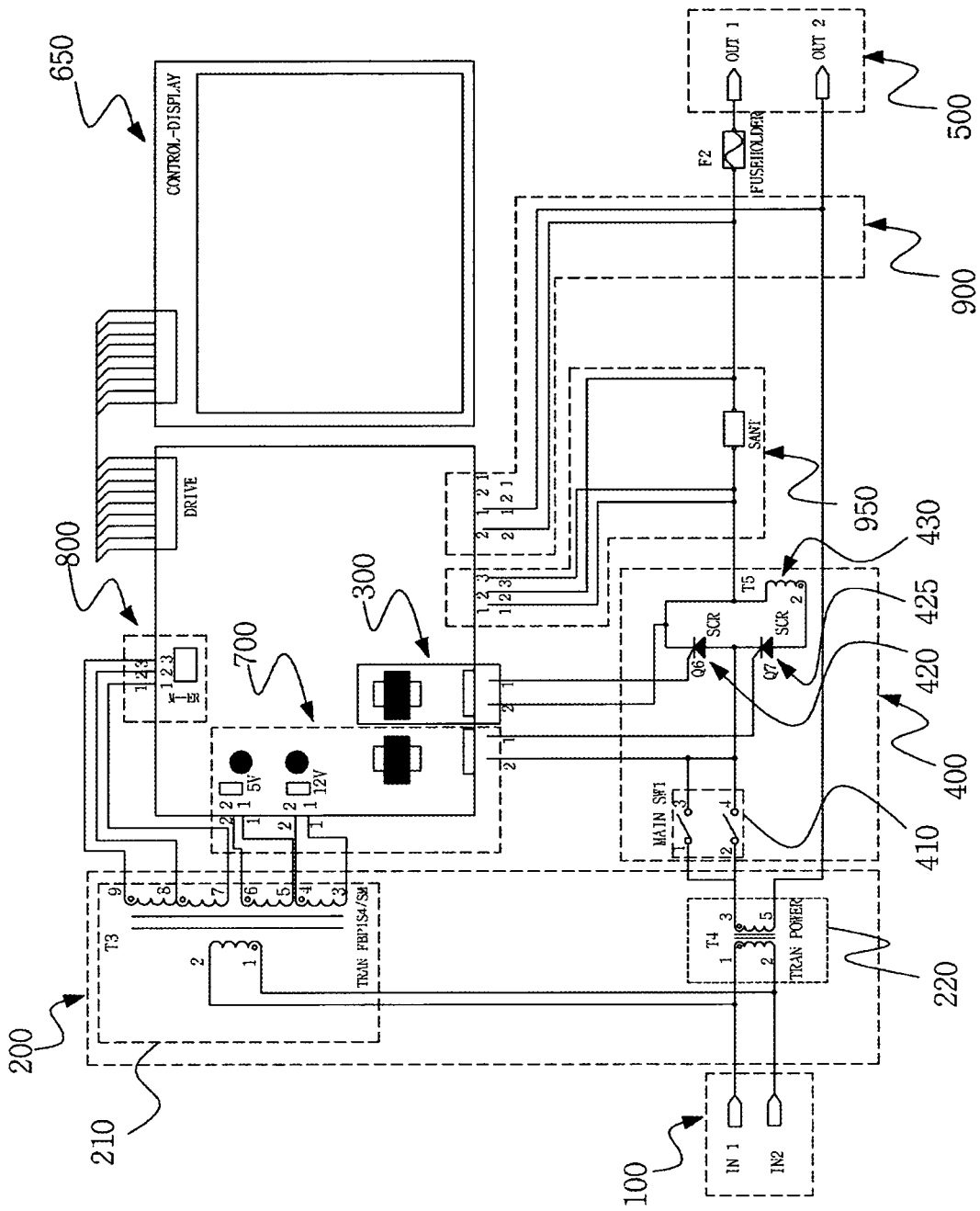
FIG. 3 is a circuit diagram illustrating the entire construction of a storage battery recycling apparatus according to a preferred embodiment of the present invention.

FIG. 2 is a block diagram illustrating the entire construction of a storage battery recycling apparatus according to a preferred embodiment of the present invention, and FIG. 3 is a circuit diagram illustrating the entire construction of a storage battery recycling apparatus according to a preferred embodiment of the present invention.

As shown in FIGS. 2 and 3, the storage battery recycling apparatus according to a preferred embodiment of the present invention includes a power input unit 100 for receiving a commercial AC power voltage from an external power source, a transformer unit 200 for transforming the commercial AC power voltage inputted to the power input unit 100 from the external power source, an SCR driving unit 400 for converting the AC power voltage transformed by the transformer unit 200 into a pulse voltage through the SCR phase control, an output terminal 500 for supplying the converted pulse voltage outputted from the SCR driving unit 400 to electrodes of the storage battery, an SCR controller 300 for controlling the operation of the SCR driving unit 400, a voltage detecting unit 900, a current detecting unit 950 and a temperature measuring unit 800 for detecting the voltage, current and temperature of the storage battery, a setting unit 600 and a display unit 650 for setting and displaying the operational environment of the storage battery recycling apparatus, and a microcomputer 700 for controlling the operation of each of the constituent elements.

The power input unit 100 is a power input device for receiving a commercial power voltage of AC 220V/60 Hz from an external power source.

The transformer unit 200 is a transformer which transforms the commercial AC power voltage applied thereto from the external power source through the power input unit 100. The transformer unit 200 includes a control transformer 210 for transforming the commercial AC power voltage into the driving power voltages for the microcomputer and the like, and a recycling transformer 220 for transforming the commercial AC power voltage into a recycling power voltage for recycling the storage battery. In the preferred embodiment of the present invention, the control transformer 210 transforms the commercial AC power voltage into a 12V power voltage for driving the microcomputer 700, a 15V power voltage for driving the temperature measuring unit 800, and a 5V power voltage for driving a variety of kinds of circuits such as the voltage detecting unit 900 and the current detecting unit 950. The transformed AC power voltage is converted into a DC power voltage through a rectifying process and then is supplied to the microcomputer 700 and the various kinds of circuits. Meanwhile, the recycling transformer 220 converts the commercial AC power voltage into an AC power voltage for recycling the storage battery depending on the charge capacity of the storage battery and applies the converted AC power voltage to the SCR driving unit 400.

The SCR driving unit 400 allows the AC power voltage converted through the recycling transformer 220 to be subjected to half-wave rectification, and then converts it into a pulse power voltage through the SCR phase control to obtain a pulse power signal for application to the output terminal 500. The SCR driving unit 400 includes a main switch 410 controlled by the microcomputer 700, two SCR elements 420 and 430 controlled by the SCR controller 300 for charging and discharging the storage battery, and a reactor 430 for absorbing an electrical shock due to a surge voltage and the like. The SCR driving unit 400 selects only a part of the waveform of the AC power voltage under the control of the SCR controller 300 and converts the selected part of the waveform into a voltage having a pulse waveform so as to generate an AC pulse waveform which is very subdivided according to the control of the SCR phase control.

The SCR controller 300 serves to drive the two SCR elements 420 and 425 included in the SCR driving unit so that the SCR driving unit converts the AC power voltage into a pulse power voltage.

Figure 4:
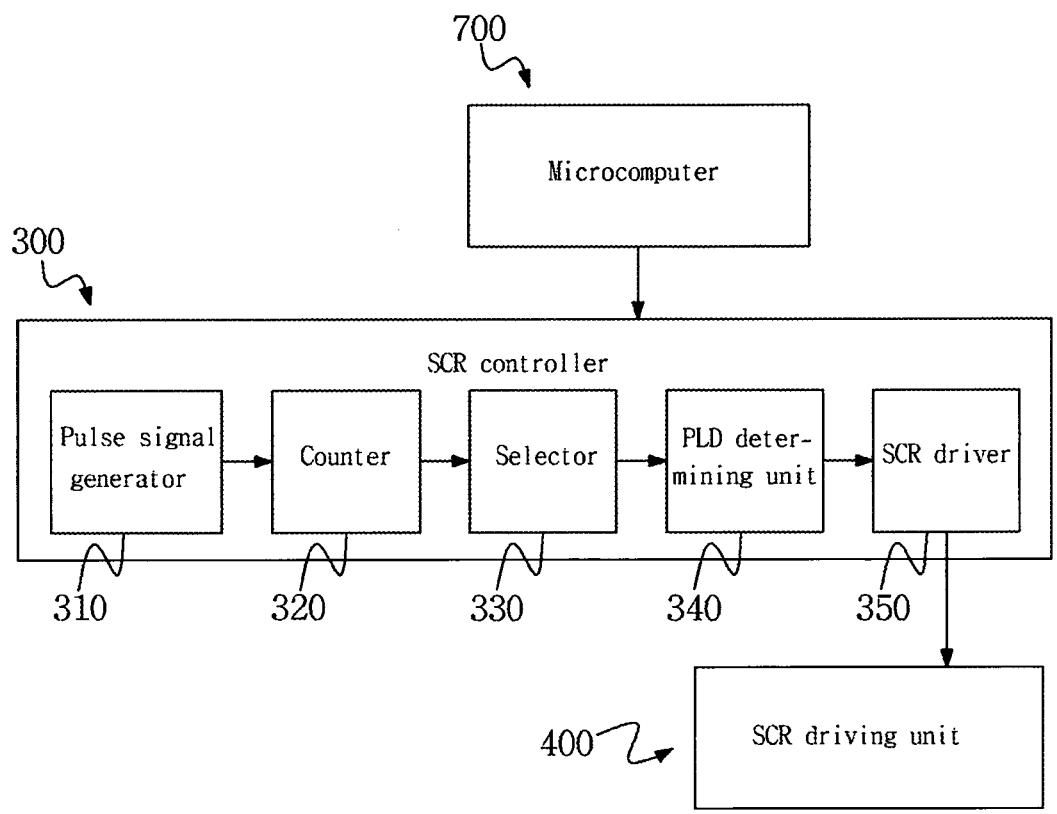
FIG. 4 is a block diagram illustrating the entire construction of an SCR controller of a storage battery recycling apparatus according to a preferred embodiment of the present invention.
Figure 5:
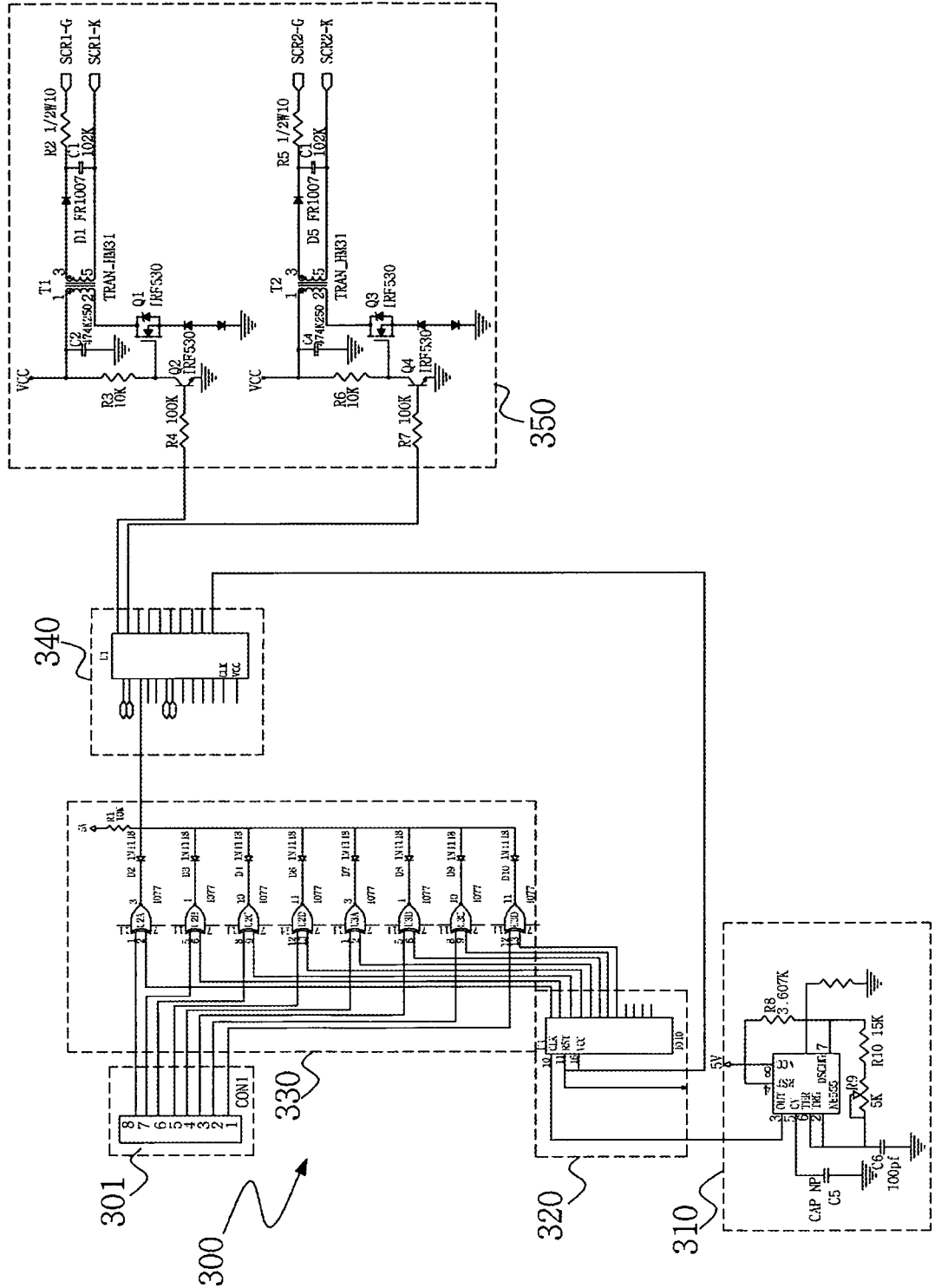
FIG. 5 is a circuit diagram illustrating the SCR controller according to a preferred embodiment of the present invention.

FIG. 4 is a block diagram illustrating the entire construction of an SCR controller of a storage battery recycling apparatus according to a preferred embodiment of the present invention, and FIG. 5 is a circuit diagram illustrating the SCR controller according to a preferred embodiment of the present invention.

As shown in FIGS. 4 and 5, the SCR controller 300 includes: a pulse signal generator 310 for generating a pulse signal for timing; a counter 320 for the pulse signal generated from the pulse signal generator 310; a selector 330 for generating $2^3$(=256) code signals by combing a 8-bit code signal applied thereto from the microcomputer 700 through a code input terminal 301 and a 8-bit counter signal applied thereto from the counter 320, and sequentially outputting the generated 256 signals; a programmable logic device (PLD) determining unit 340 for checking the phases of the signals according to the order of the code signals outputted from the selector 330, and selecting an output signal in response to a pulse selecting signal applied thereto from the microcomputer 700; and an SCR driver 350 for controlling the operation of each of the two SCR elements 420 and 425 included in the SCR driving unit 400 in response to the output signal from the PLD determining unit 340.

The 256 code signals outputted from the selector 330 are signals which are outputted for one cycle of the AC power voltage. An AC waveform of one cycle duration can be divided into 256 segments to enable the phase control.

Figure 6:
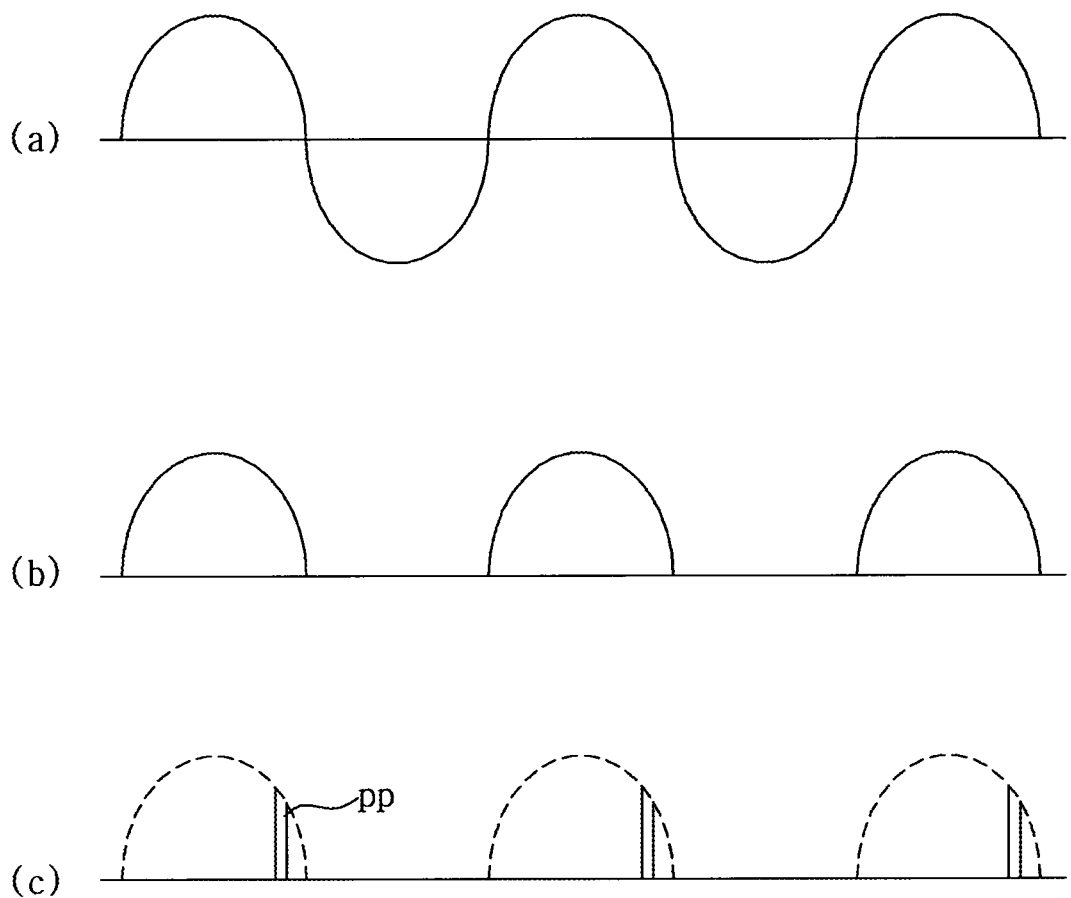
FIG. 6 is a waveform diagram illustrating the waveforms of a power voltage supplied to an SCR driving unit of a storage battery recycling apparatus according to a preferred embodiment of the present invention.

FIG. 6 is a waveform diagram illustrating the waveforms of a power voltage supplied to an SCR driving unit of under the control the SCR controller according to a preferred embodiment of the present invention.

FIG. 6(a) shows a waveform of the AC power voltage transformed by the transformer unit 200 and applied the SCR driving unit 400, FIG. 6(b) shows a waveform of the AC power voltage subjected to half-wave rectification through the SCR element 420 of the SCR driving unit 400, and FIG. 6(c) shows a waveform of the pulse voltage subjected to the phase control through the SCR element 420 of the SCR driving unit 400.

The SCR elements 420 and 425 of the SCR driving unit 400 are driven under the control of the SCR controller 300. First, the AC power voltage is supplied to the charging SCR element Q2 420 of the two SCR elements 420 and 425 during the charging of the storage battery as shown in FIG. 6(a) and is half-wave rectified as shown in FIG. 6(b). Then, a pulse waveform (PP) of the waveform of the half-wave rectified power voltage is selected by a phase selected by the SCR controller 300 and is applied to the output terminal 500. That is, the selector 330 of the SCR controller 300 divides the AC waveform of one cycle into 256 segments, and the charging SCR element 420 passes only one divided pulse waveform (PP) of the waveform of the half-wave rectified power voltage for application to the output terminal 500. The selected pulse waveform (PP) is determined by the PLD determining unit 340 of the SCR controller 300. The PLD determining unit 340 determines the pulse waveform in response to a command of the microcomputer 700. Thus, if the phase of the output pulse waveform can be selected according to the setting of the microcomputer 700 so as to adjust the magnitude of the output power voltage, the size of the selector 330 may be changed to select the waveform divided into more or less segments than 256 ones. Through the SCR phase control, the waveform of the output power voltage can be selected without undergoing a separate process for converting the DC power voltage into the AC power voltage, thereby simplifying the construction of a circuitry and enabling selection of a pulse waveform divided into more segments. The voltage having a pulse waveform generated from the SCR driving unit 400 is supplied to the electrodes of the storage battery through the output terminal 500 to cause vibration to the electrodes so as to remove membranous sulfate deposited on the electrodes and dissolve suspended solids of the sulfate to cause the specific gravity of sulfuric acid in the storage battery to return to its original state, thereby resulting a decrease in internal resistance of the batteries to achieve the recycling of the storage battery.

On the other hand, the supply of the AC power voltage to the charging SCR element Q2 420 is interrupted during the discharging of the storage battery, and the discharging SCR element Q1 425 is driven so that a power voltage having a waveform selected according to the driving of the discharging SCR element Q1 425 is reversely applied to the transformer unit 200. The reversely applied power voltage returns to the Electric Power Corporation so as to achieve the power saving effect. The pulse waveform of the power voltage during the driving of the discharging SCR element 425 has a negative phase value opposite to a phase of the waveform shown in FIGS. 6(*a*) and 6(*b*).

Figure 7:
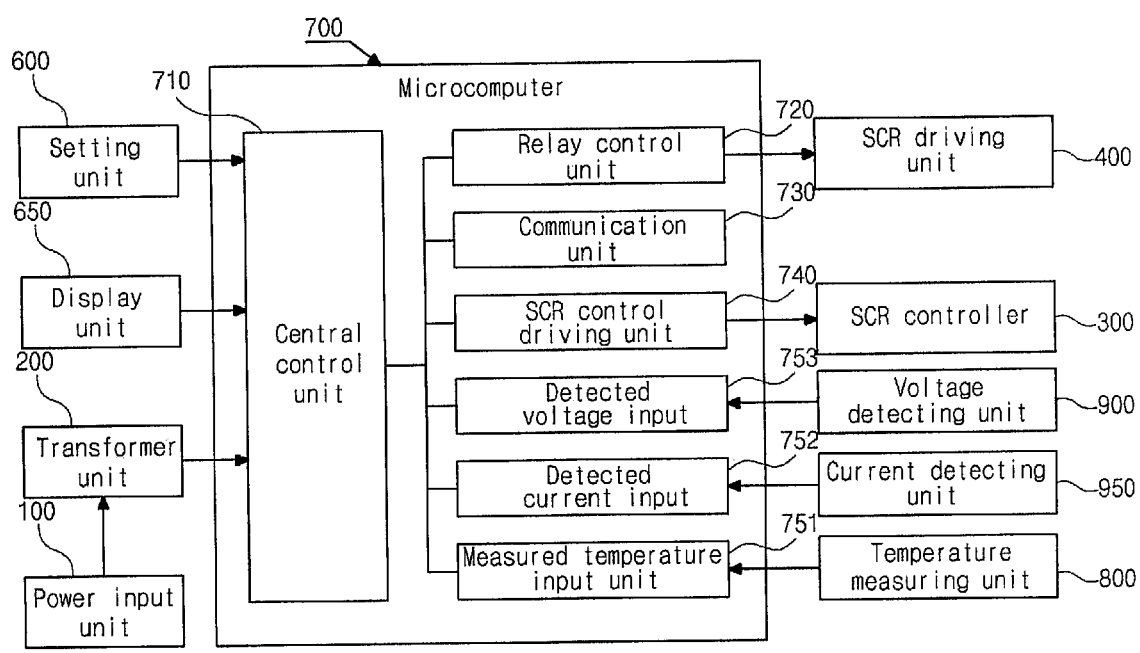
FIG. 7 is a block diagram illustrating of a microcomputer of a storage battery recycling apparatus according to a preferred embodiment of the present invention.
Figure 8:
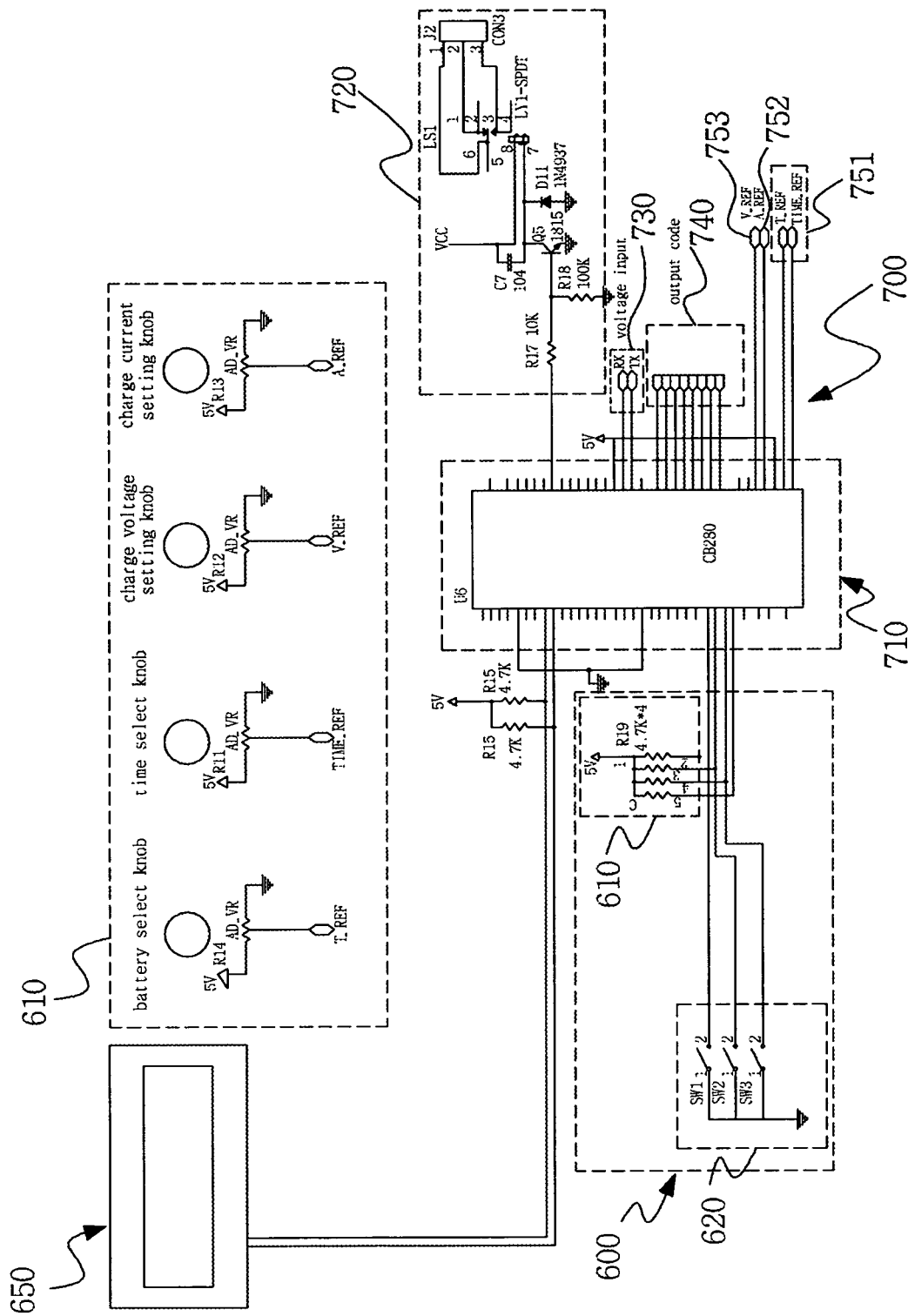
FIG. 8 is a circuit diagram illustrating of the microcomputer according to a preferred embodiment of the present invention.

FIG. 7 is a block diagram illustrating of a microcomputer of a storage battery recycling apparatus according to a preferred embodiment of the present invention, and FIG. 8 is a circuit diagram illustrating of the microcomputer according to a preferred embodiment of the present invention.

As shown in FIGS. 7 and 8, the microcomputer 700 according to the present invention includes: a relay control unit 720 for transmitting a contact point signal to the main switch 410 included in the SCR driving unit 400; a communication unit 730 for performing the wired and wireless communication with an external communication device; an SCR control driving unit 740 for transmitting a code output and control signal to the SCR controller 300; a detected voltage input unit 753 for receiving a voltage signal from the voltage detecting unit 900; a detected current input unit 752 for receiving a current signal from the current detecting unit 950; a measured temperature input unit 751 for receiving a temperature signal from the temperature measuring unit 800; and a central control unit 710 for controlling the operation of each of the constituent elements of the microcomputer 700.

The central control unit 710 generates a control signal according the setting conditions of the setting unit 600 and applies the generated control signal to the SCR driving unit 400 and the SCR controller 300 through the relay control unit 720 and the SCR control driving unit 740. The central control unit 710 checks the voltage signal, the current signal and the temperature signal applied thereto from the detected voltage input unit 753, the detected current input unit 752 and the measured temperature input unit 751, and display the voltage, current and temperature signals on the display unit 650.

The setting unit 600 is an input device which sets the operational environment of the storage battery recycling apparatus. The setting unit 600 includes a storage battery charging/discharging select button, an operation button, a stop button, a storage buttery capacity setting switch (knob), a voltage setting switch, a current setting switch, a time setting switch, etc.

The display unit 650 includes an LCD window for displaying the operational environment of the storage battery recycling apparatus checked by the microcomputer 700 thereon, and a power lamp for indicating a power voltage, a charging lamp for indicating the charging state of the storage battery, a discharging lamp for indicating the discharging state of the storage battery, etc.

The current detecting unit 950 is a current detecting circuit which is mounted between the SCR driving unit 400 and the output terminal 500 so as to be connected in series with the SCR driving unit 400 and the output terminal 500. The current detecting unit 950 detects the current of the storage battery and applies a signal indicating the detected current to the microcomputer 700. The voltage detecting unit 900 is a voltage detecting circuit which is mounted between the SCR driving unit 400 and the output terminal 500 so as to be connected in parallel with the SCR driving unit 400 and the output terminal 500. The voltage detecting unit 900 detects the voltage of the storage battery. In addition, the temperature measuring unit 800 is a temperature sensor which measures the ambient temperature of the storage battery and is adapted to be in close contact with the electrodes of the storage battery so as to measure the temperature of the storage battery.

Figure 9:
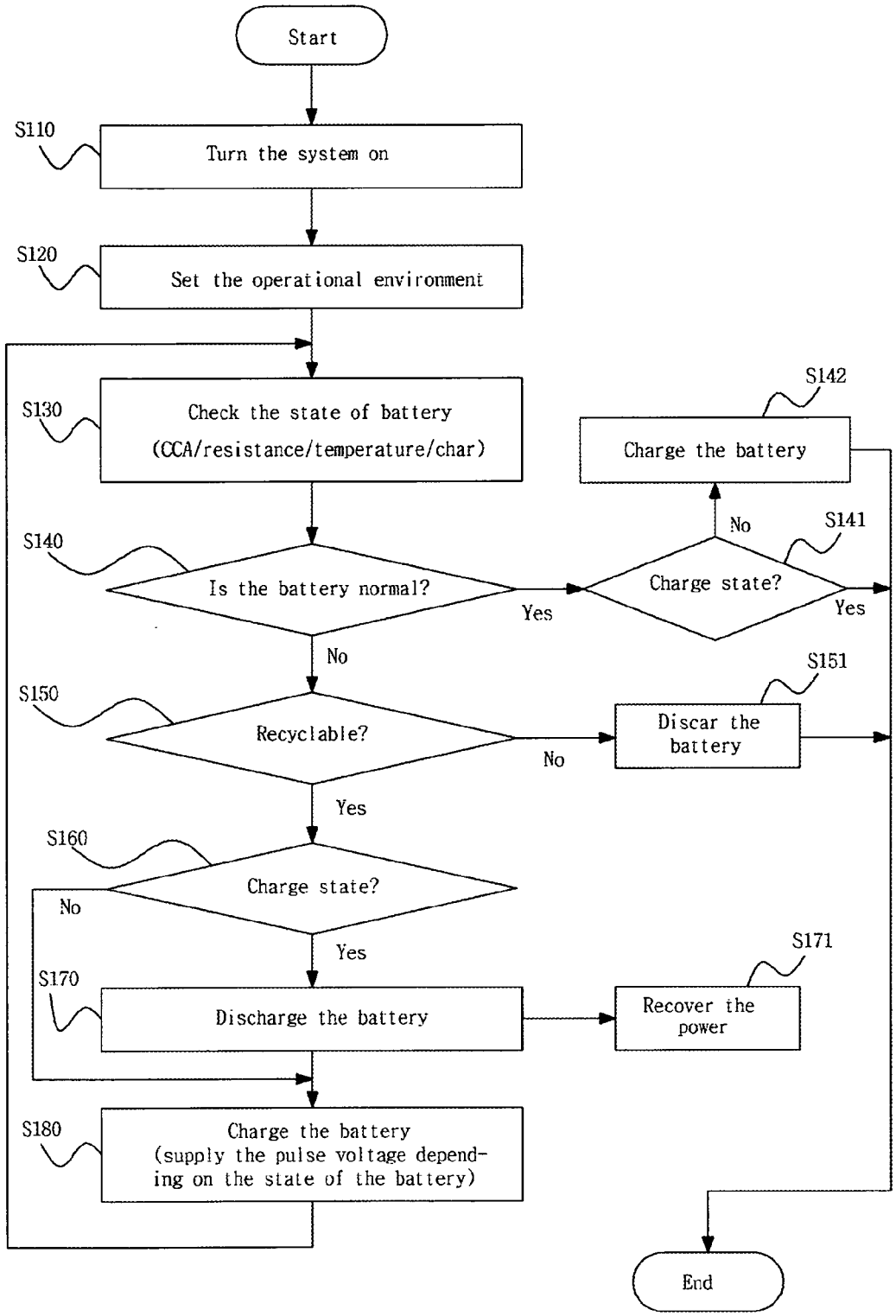
FIG. 9 is a flowchart illustrating the operational process of a storage battery recycling apparatus according to a preferred embodiment of the present invention.

Now, the operational process of the storage battery recycling apparatus according to the present invention as constructed above will be described hereinafter in detail with reference to FIG. 9.

At step S110 and S120, first, when a commercial AC power voltage is supplied to the storage battery recycling apparatus so as to turn the system on, the operational environment of the storage battery, i.e., capacity, voltage, current, time, etc., of the storage battery are set through the setting unit 600.

At subsequent step S130, first, the output terminal of the storage battery recycling apparatus is brought into close contact with the electrodes of the storage battery so as to check the charging state of the storage battery. In order to check the state of the storage battery, the measurement of Cold Cranking Amperes (CCA) of the storage battery, the measurement of the temperature of the storage battery, the measurement of the charging state of the storage battery, the discharging test of the storage battery, etc., are performed.

Then, if the state of the storage battery is measured, the program proceeds to step S140 where it is determined whether or not the state of the storage battery is normal. In the preferred embodiment of the present invention, if the CCA is more than 530 CCA at a reference current of 80 A and a measured resistance is 0.05Ω, it is determined that the state of the storage battery is normal.

If it is determined at step S140 that the state of the storage battery is normal, the program proceeds to step S141 where the microcomputer 700 checks the charging state of the storage battery. If it is determined at step S141 that the storage battery is not charged, the program proceeds to step S142 where the storage battery is charged, and then the microcomputer 700 terminates a recycling process.

On the other hand, if it is determined at step S140 that the state of the storage battery is not normal, the program proceeds to step S150 where the microcomputer 700 determines whether or not the storage battery is recyclable. If the state of the storage battery becomes better through the comparison between the charging state of the storage battery checked in the previous step and the state of the storage battery after the charging and discharging process which will be performed subsequently, it is determined at step S150 that the storage battery is recyclable. If, on the other hand, there is a change in the state of the storage battery, it is determined at step S150 that the storage battery is not recyclable and the program proceeds to step S151 where the storage is discarded.

If it is determined at step S140 that the state of the storage battery is abnormal and it is determined at step S150 that the storage battery is recyclable, the program proceeds to step S160 where the microcomputer 700 determines whether or not the storage battery is in a charge state so as to perform the recycling operation of the storage battery. If it is determined at step S160, the program proceeds to step S170 where a discharge mode is selected through the setting unit 600 so as to discharge the storage battery. In this case, the discharging of the storage battery is performed in such a fashion that the microcomputer 700 applies a discharge signal to the SCR controller 300 according to the discharge setting of the storage battery of the setting unit 60 so as to cause the SCR controller 300 to drive the discharging SCR element 425 of the SCR driving unit 400 so that the power voltage of the storage battery is reversely supplied to the transformer unit 200 through the output terminal 500. In this manner, when the storage battery is discharged, the power voltage of the storage battery is reversely supplied to the transformer unit 200 and the power voltage inversely transformed through the transformer unit 200 is applied to the power input unit 100 so as to achieve an effect of allowing Electric Power Corporation to recover the electric power. In the preferred embodiment of the present invention, the discharging of the storage battery is performed until the voltage of the storage battery drops to less than 5V.

After the discharging of the storage battery has been performed, the charging process is performed at step S180. The charging of the storage battery is performed in such a fashion that the microcomputer 700 applies a charge signal to the SCR controller 300 according to the charge setting of the storage battery of the setting unit 60 so as to cause the SCR controller 300 to drive the discharging SCR element 420 of the SCR driving unit 400 so that a pulse voltage for charging is supplied to the storage battery through the output terminal 500. As the charging of the storage battery progresses, the pulse voltage is supplied to the electrodes of the storage battery so as to remove membranous sulfate deposited on the electrodes and dissolve suspended solids of the sulfate to cause the specific gravity of sulfuric acid in the storage battery to return to its original state, thereby achieving the recycling of the storage battery. In the preferred embodiment of the present invention, the charging of the storage battery is performed for 30 minutes, and the discharging and charging of the storage battery is basically performed three times.

After the storage batter has been charged, the program returns to the above step S130 where the microcomputer 700 checks the state of the storage battery. Then, if it is determined at step S140, S141 and S142 that the storage battery is normally recycled according to the discharging and charging of the storage battery, the recycling process is terminated. If it is determined the state of the storage battery is abnormal, If the state of the storage battery did not become better through the comparison between the state of the storage battery checked at step S130 and the state of the storage battery checked at the previous step, it is determined at step S150 that the storage battery is not recyclable, and the program proceeds to step S151 where the storage battery is discarded. On the other hand, if the state of the storage battery becomes better, the subsequent steps are repeatedly performed.

The recycling of the storage battery is achieved through the above recycling process, and the electric power discharged from the storage battery during the discharge of the storage battery is reversely supplied to the power input unit 100, thereby increasing the power saving efficiency.

The invention claimed is:

1. An apparatus for recycling a storage battery, which supplied a power supply voltage to electrodes of the storage battery to remove sulfate formed on the electrodes of the storage battery so as to recover the performance of the storage battery in a deteriorated state, the apparatus comprising:
a transformer unit for transforming a commercial AC power voltage supplied thereto from an external power source through a power input unit;
a silicon-controlled rectifier (SCR) driving unit for converting the AC power voltage transformed by the transformer unit into a first voltage having a half-wave form through a half-wave rectification and converting the first voltage into a second voltage having a pulse waveform through the SCR phase control;
an output terminal adapted to be in close contact with the electrodes of the storage battery for supplying the converted second voltage outputted from the SCR driving unit to the electrodes of the storage battery so as to charge the storage battery;
an SCR controller for controlling the operation of the SCR driving unit;
a setting unit and a display unit for setting and displaying the operational environment of the storage battery recycling apparatus;
a voltage detecting unit and a current detecting unit for detecting the voltage and current of the storage battery; and
a microcomputer for controlling the operation of each of the constituent elements,
wherein the SCR driving unit comprises:
a first SCR element adapted to be driven upon the charging of the storage battery for converting the AC power voltage applied thereto from the transformer unit into a voltage having the pulse waveform under the control of the SCR controller; and
a second SCR element adapted to be driven upon the discharging of the storage battery for converting the power voltage applied thereto according to the discharge of the storage battery into a pulse voltage for application to the transformer unit under the control of the SCR controller,
wherein an anode of the first SCR element and a cathode of the second SCR element are connected to a single terminal of the transformer unit, and
wherein a cathode of the first SCR element is connected to a single terminal of the current detecting unit and an anode of the second SCR element is connected to the single terminal of the current detecting unit through a reactor.

2. The apparatus according to claim 1, wherein the SCR driving unit further comprises:
a main switch for electrically connecting the first SCR element for charging the storage battery and the second SCR element for discharging the storage battery to the transformer unit, and interrupting the electrical connection therebetween under the control of the microcomputer; and
the reactor for absorbing an electrical shock due to a surge voltage generated from the storage battery and supplied to the second SCR element through the output terminal and protecting the SCR driving unit.

3. The apparatus according to claim 1, wherein the SCR controller comprises:
a pulse signal generator for generating a pulse signal for timing;
a counter for the pulse signal generated from the pulse signal generator;
a selector for generating a plurality of code signals by combing a code signal applied thereto from the microcomputer and a counter signal applied thereto from the counter and sequentially outputting the generated plurality of signals;

a programmable logic device (PLD) determining unit for checking the phases of the signals according to the order of the code signals outputted from the selector, and selecting an output signal in response to a pulse selecting signal applied thereto from the micro-computer; and an SCR driver for controlling the operation of each of the first and second SCR elements included in the SCR driving unit in response to the output signal from the PLD determining unit.

4. The apparatus according to claim 1, wherein the SCR driving unit divides the first voltage into a plurality of segments and selects one of the plurality of segments as the second voltage.

5. The apparatus according to claim 1, wherein the voltage detecting unit is mounted between the SCR driving unit and the output terminal so as to be connected in parallel with the SCR driving unit and the output terminal.

6. The apparatus according to claim 1, wherein the current detecting unit is mounted between the SCR driving unit and the output terminal so as to be connected in series with the SCR driving unit and the output terminal.

7. The apparatus according to claim 1, wherein the micro-computer comprises:

a relay control unit for transmitting a contact point signal to a main switch included in the SCR driving unit;

an SCR control driving unit for transmitting a code output and control signal to the SCR controller;

a detected voltage input unit for receiving a voltage signal from the voltage detecting unit;

a detected current input unit for receiving a current signal from the current detecting unit;

a measured temperature input unit for receiving a temperature signal from a temperature measuring unit; and a central unit for controlling the operation of each of the constituent elements of the microcomputer.

8. The apparatus according to claim 7, wherein the micro-computer further comprises;

a measured temperature input unit for receiving a temperature signal from the temperature measuring unit; and a communication unit for performing the wired and wireless communication with an external communication device.

* * * * *